US009795893B2

(12) United States Patent
Harrington

(10) Patent No.: US 9,795,893 B2
(45) Date of Patent: Oct. 24, 2017

(54) MACROSCOPIC PSUEDO MAGNETIC MONOPOLES AND FABRICATION TECHNIQUES

(71) Applicant: Harrington Electronics LLC, Dexter, MI (US)

(72) Inventor: Richard H. Harrington, Dexter, MI (US)

( * ) Notice: Subject to any disclaimer, the term of this patent is extended or adjusted under 35 U.S.C. 154(b) by 0 days.

(21) Appl. No.: 15/051,954

(22) Filed: Feb. 24, 2016

(65) Prior Publication Data

US 2016/0243456 A1    Aug. 25, 2016

Related U.S. Application Data

(60) Provisional application No. 62/119,961, filed on Feb. 24, 2015.

(51) Int. Cl.
| | |
|---|---|
| *A63H 33/26* | (2006.01) |
| *A63H 33/04* | (2006.01) |
| *G09B 23/18* | (2006.01) |
| *G09B 1/38* | (2006.01) |
| *A63F 9/12* | (2006.01) |

(52) U.S. Cl.
CPC .......... *A63H 33/046* (2013.01); *G09B 1/38* (2013.01); *G09B 23/181* (2013.01); *A63F 2009/1212* (2013.01)

(58) Field of Classification Search
CPC .. A63H 33/046; G09B 1/38; A63F 2009/1212
USPC ............................................. 446/85, 92, 129
See application file for complete search history.

(56) References Cited

U.S. PATENT DOCUMENTS

| | | | | |
|---|---|---|---|---|
| 3,095,668 A | * | 7/1963 | Dorsett ................ | A63H 33/046 12/146 B |
| 3,706,158 A | * | 12/1972 | Jensen ................... | A63H 33/26 446/92 |

(Continued)

FOREIGN PATENT DOCUMENTS

| | | |
|---|---|---|
| CN | 201663026 | 12/2010 |
| CN | 102867447 | 1/2013 |
| CN | 202929924 | 5/2013 |

OTHER PUBLICATIONS

English translation of abstract for CN102867447.
English translation of abstract for CN202929924.
English translation of abstract for CN201663026.

*Primary Examiner* — Alexander Niconovich
(74) *Attorney, Agent, or Firm* — John G. Posa; Belzer PC

(57) ABSTRACT

Pseudo magnetic monopoles made from a plurality of building blocks, each having one outer surface that is substantially a north magnetic pole and an opposing outer surface that is substantially a south magnetic pole. The building blocks are assembled to form a hollow object having an inner surface and an outer surface, with all of the north or south poles of the building blocks facing outwardly, such that entire outer surface of the object is substantially either north or south. The building blocks may be magnetized before or after they are assembled to form the hollow object. The hollow object may be a sphere. The building blocks may have tapered side surfaces to minimize gaps between the building blocks when they are assembled to form the hollow object. A plurality of the objects may be provided in kit form as a teaching tool.

12 Claims, 1 Drawing Sheet

(56) References Cited

U.S. PATENT DOCUMENTS

| | | | | |
|---|---|---|---|---|
| 3,998,004 A * | 12/1976 | Ehrlich | A63H 33/046 | 428/900 |
| 4,238,905 A * | 12/1980 | MacGraw, II | A63H 33/046 | 273/157 R |
| 5,009,625 A * | 4/1991 | Longuet-Higgins | A63H 33/046 | 434/211 |
| 5,021,021 A * | 6/1991 | Ballard | A63H 33/046 | 335/285 |
| 5,347,253 A * | 9/1994 | Ogikubo | A63F 9/12 | 273/239 |
| 5,826,872 A * | 10/1998 | Hall | A63F 9/12 | 273/156 |
| 6,017,220 A * | 1/2000 | Snelson | A63H 33/046 | 434/211 |
| 6,116,979 A * | 9/2000 | Weber | A63F 9/1208 | 273/157 R |
| 6,739,938 B2 * | 5/2004 | Dokoupil | H02N 15/00 | 446/129 |
| 6,749,480 B1 * | 6/2004 | Hunts | A63H 33/046 | 446/85 |
| 7,110,236 B2 * | 9/2006 | Joachim | H02N 15/00 | 361/139 |
| 7,320,633 B2 * | 1/2008 | Park | A63H 33/046 | 446/131 |
| 7,507,136 B2 * | 3/2009 | Patton | A63H 33/046 | 335/285 |
| 7,955,155 B2 * | 6/2011 | Tremblay | A63H 33/046 | 446/85 |
| 7,955,156 B2 * | 6/2011 | Toht | A63H 33/046 | 446/115 |
| 7,985,116 B2 * | 7/2011 | Song | A63H 33/046 | 446/129 |
| 8,475,225 B2 * | 7/2013 | Kretzschmar | A63H 33/046 | 446/137 |
| 8,480,449 B2 * | 7/2013 | Cheng | A63F 9/12 | 273/153 R |
| 8,490,974 B2 * | 7/2013 | Stolten | A63F 9/0838 | 273/153 S |
| 9,314,707 B2 * | 4/2016 | Ornstein | A63H 33/046 | |
| 2005/0029735 A1 * | 2/2005 | Liu | A63F 9/12 | 273/156 |
| 2006/0168937 A1 * | 8/2006 | St. Clair | B64G 1/409 | 60/203.1 |
| 2008/0264522 A1 * | 10/2008 | Conway | A44C 27/001 | 148/101 |
| 2011/0136404 A1 * | 6/2011 | Silverglate | A63H 33/04 | 446/489 |
| 2014/0084545 A1 * | 3/2014 | Taylor | G09B 1/38 | 273/456 |
| 2014/0227934 A1 * | 8/2014 | Rudisill | A63H 33/046 | 446/92 |
| 2015/0258461 A1 * | 9/2015 | Balanchi | A63H 33/046 | 446/92 |

* cited by examiner

MACROSCOPIC PSUEDO MAGNETIC MONOPOLES AND FABRICATION TECHNIQUES

REFERENCE TO RELATED APPLICATION

This application claims priority from U.S. Provisional Patent Application Ser. No. 62/119,961, filed Feb. 24, 2015, the entire content of which is incorporated herein by reference.

FIELD OF THE INVENTION

This invention relates generally to magnetism and, in particular, to pseudo macroscopic magnetic monopoles and methods of making them.

BACKGROUND OF THE INVENTION

As the name suggests, a magnetic monopole is a magnetic particle possessing only a single, isolated pole—a north pole without a south pole, or vice versa. Such particles were predicted by Paul Dirac in 1931, but have never been seen in nature. However, an analogue of a long-sought-after particle comprising an isolated magnetic pole has been observed by physicists in the U.S. and Finland. See http://physicsworld.com/cws/article/news/2014/jan/30/magnetic-monopoles-seen-in-the-lab. This latest work does not prove whether or not the unusual particles exist, rather it shows that a physical system described by the underlying mathematics can be created in the lab. The research could also help physicists to gain a better understanding of exotic materials such as superconductors, and even create materials with new and useful properties.

SUMMARY OF THE INVENTION

This invention resides in pseudo magnetic monopoles made from a plurality of building blocks. Each building block has one outer surface that is substantially a north magnetic pole and an opposing outer surface that is substantially a south magnetic pole. The building blocks are assembled to form a hollow object having an inner surface and an outer surface, with all of the north or south poles of the building blocks facing outwardly, such that entire outer surface of the object is substantially either north or south.

The building blocks may be magnetized before or after they are assembled to form the hollow object. The hollow object may be a sphere. The building blocks may have tapered side surfaces to minimize gaps between the building blocks when they are assembled to form the hollow object.

The building blocks may be cubes, truncated pyramids, or truncated bodies having a convex outer dome and 3, 5, 6 or more flat sides that converges to a point. A plurality of the assembled pseudo magnetic monopoles may be provides having the same or different magnetized outer surfaces to teach magnetic attraction and/or repulsion principles.

DETAILED DESCRIPTION OF THE INVENTION

This disclosure describes a magnetic monopole that can easily be fabricated without an accelerator. More particularly, this invention facilitates the construction of pseudo magnetic monopoles by enclosing all of the opposite poles so that they are not detectable on the outside surface of the final object or shape. One magnetic monopole of this invention can be a north pole and the other a south pole, that is a single object that for all practical purposes has just one pole.

Figure 1:
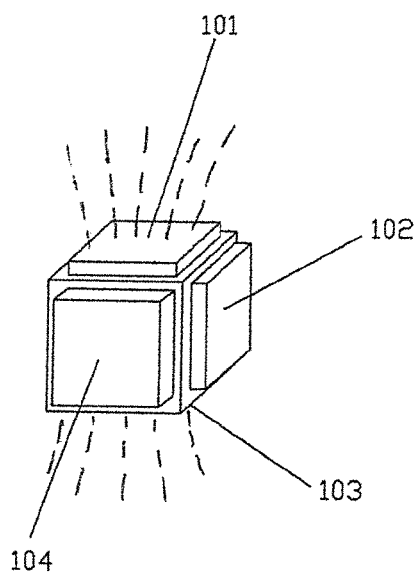
FIG. 1 shows a magnetic cube that can be used to form spheres and other geometric objects.

FIG. 1 shows a magnetic cube that can be used to form spheres and other geometric objects in accordance with the invention. The object is magnetized such that surfaces 101, 103 are north or south, or vice versa, with the other sides such as 102, 104 having negligible flux lines. The cube may be constructed from a natural or synthetic permanent magnetic material, preferably a powerful rare earth variety, or may be constructed from a magnetizible material such as iron, nickel or cobalt, or alloys thereof, then magnetized.

Figure 2:
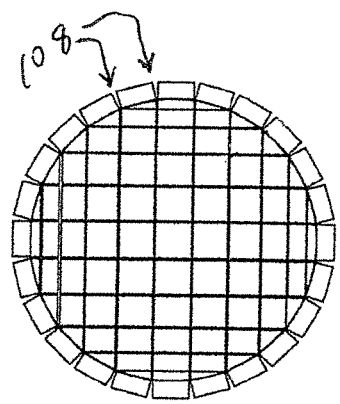
FIG. 2 depicts a sphere that has many magnets with only the south poles facing outward.

FIG. 2 shows a sphere that has many of the magnets of FIG. 1 with only the south (or north) poles facing outward. This device will repel all other spheres with the same magnet placement. Conversely, it will attract all spheres with the north pole magnets facing outwardly. As such, the shape of FIG. 2, as well as the other objects described herein, can be used as entertaining and educational aids for teaching magnetism, including interactions that might occur between "real" monopoles.

Figure 3:
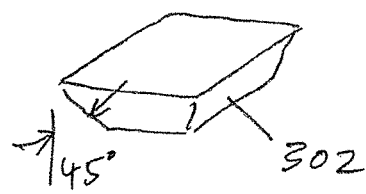
FIG. 3 shows a magnetic wedge particularly suited to the construction of magnetic shapes with flat sides.
Figure 4:
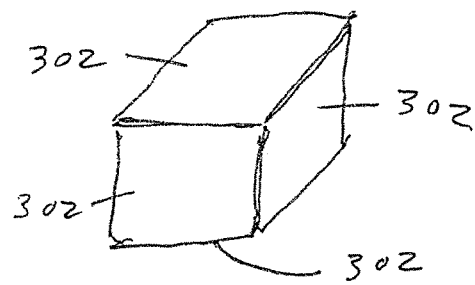
FIG. 4 illustrates a square built with the wedges of FIG. 3.

A sphere is one possible geometric shape, but the basic monopole design can be implemented using cubes, rectangular objects, and any other object that can have all of the same poles facing outward. In broad and general terms, this invention anticipates a sphere (or other object) covered with magnetic material, and then magnetized using a strong, but spatially small to form magnets with the same pole everywhere on the surface. FIG. 3, for example, illustrates a truncated pyramid shape 302 that may be used to form the square pseudo monopole of FIG. 4. In this case the angle of the taper is 45 degrees. The cube of FIG. 1 may likewise have tapered sides 102, 104, etc. to minimize the gaps 108 shown in FIG. 2. Such tapered would be a function of number of cubes used to approximate the sphere, with the sides being closer to normal with the inner and outer surfaces if a very large number of cubes (or other shapes) are used for the approximation.

One approach to building a sphere is to use a truncated pyramid type shape with 3, 5 or more flat sides and a convex outer dome to approximate a spherical outer surface when assembled. Building blocks with five flat sides may be used to build a sphere that looks like a soccer ball; building blocks with six flat sides may be used to build a sphere that looks like a Buckminsterfullerene (or bucky-ball), a spherical fullerene molecule with the formula C60. Building blocks with mixed shapes can be used to construct a spherical "geodesic dome," and so forth.

The cubes, wedges or other shapes may be bonded to one another with any suitable adhesive, and other techniques such low-temperature welding may also be used. In the preferred embodiments, however, the same pole of one magnet is not intimately bonded directly to a second magnet, such as gluing two south poles together as the magnets will de-magnetize each other in a short time such as a few hours.

However if a small space such as one or two magnet thicknesses are allowed, the de-magnetization will be minimized or not be present.

Typical fabrication can be a non-magnetic sphere with super magnet squares or discs glued on so that the entire surface is covered with magnets with the same pole facing out. This sphere may be covered or coated with a non-magnetic material for robustness. Further it may have the letter S or the word SOUTH in one or more places if it is the south pole variety and conversely the letter N or the word NORTH if it is of that variety.

An alternative method of manufacturing the monopole is to have a closed surface such as a hollow sphere made from a magnetic material and then magnetize it through the thickness with just one magnetic field direction such as moving a very strong magnet with just the north pole against the sphere and move it around so that it magnetizes the entire surface. The inside surface of the sphere will be a north pole everywhere. If edge beveling is used, this is preferably done prior to assembly. "Spear" shapes may be used, coated with magnetic material, then magnetized prior to final assembly.

If the same pole sphere devices are place in a tube, and forced together with a plunger and a pin is placed in the tube to keep them together, when the pin is removed, one or more will come out at a high velocity, nice physics experiment. The invention finds utility as a device to teach what magnetic monopoles are all about.

The invention claimed is:

1. A pseudo magnetic monopole, comprising:
a plurality of building blocks, each building block having a first outer surface that is substantially of the same north or south magnetic polarity, and an opposing outer surface that is substantially of the opposite north or south magnetic polarity;
wherein the building blocks are permanently bonded to one another to form a hollow object having an inner surface and an outer surface, with all of the first outer surfaces of the building blocks facing outwardly; and
wherein the object is coated with magnetic material, then magnetized such that entire outer surface of the object is substantially either north or south.

2. The pseudo magnetic monopole of claim 1, wherein the building blocks are magnetized before or after they are permanently bonded to one another to form the hollow object.

3. The pseudo magnetic monopole of claim 1, wherein the hollow object is a sphere.

4. The pseudo magnetic monopole of claim 1, wherein the building blocks have tapered side surfaces to minimize gaps between the building blocks when they are permanently bonded to one another to form the hollow object.

5. The pseudo magnetic monopole of claim 1, wherein the building blocks are cubes.

6. The pseudo magnetic monopole of claim 1, wherein the building blocks are truncated pyramids.

7. The pseudo magnetic monopole of claim 1, wherein the building blocks include truncated bodies with 3 flat sides converging to a point and a convex outer dome.

8. The pseudo magnetic monopole of claim 1, wherein the building blocks include truncated bodies with 5 flat sides converging to a point and a convex outer dome.

9. The pseudo magnetic monopole of claim 1, wherein the building blocks include truncated bodies with 6 flat sides converging to a point and a convex outer dome.

10. The pseudo magnetic monopole of claim 1, wherein the building blocks are coated with magnetic material, then magnetized prior to assembly.

11. The pseudo magnetic monopole of claim 1, wherein the building blocks are permanently bonded to one another with an adhesive.

12. The pseudo magnetic monopole of claim 1, wherein the building blocks are permanently welded to one another.

* * * * *